United States Patent
Hartman et al.

(10) Patent No.: US 7,831,677 B1
(45) Date of Patent: Nov. 9, 2010

(54) BULK ELECTRONIC MESSAGE DETECTION BY HEADER SIMILARITY ANALYSIS

(75) Inventors: Alfred C. Hartman, Round Rock, TX (US); Carey S. Nachenberg, Northridge, CA (US)

(73) Assignee: Symantec Corporation, Mountain View, CA (US)

( * ) Notice: Subject to any disclaimer, the term of this patent is extended or adjusted under 35 U.S.C. 154(b) by 90 days.

(21) Appl. No.: 12/413,287

(22) Filed: Mar. 27, 2009

Related U.S. Application Data

(62) Division of application No. 10/942,395, filed on Sep. 16, 2004, now Pat. No. 7,555,524.

(51) Int. Cl.
*G06F 15/16* (2006.01)

(52) U.S. Cl. .................. 709/206; 709/203; 709/217; 709/223

(58) Field of Classification Search .............. 709/206, 709/207, 203, 217, 223, 224
See application file for complete search history.

(56) References Cited

U.S. PATENT DOCUMENTS

| | | | | |
|---|---|---|---|---|
| 6,052,709 | A * | 4/2000 | Paul | 709/202 |
| 6,161,130 | A * | 12/2000 | Horvitz et al. | 709/206 |
| 6,330,590 | B1 * | 12/2001 | Cotten | 709/206 |
| 6,507,866 | B1 * | 1/2003 | Barchi | 709/207 |
| 6,915,334 | B1 * | 7/2005 | Hall | 709/207 |
| 7,051,023 | B2 * | 5/2006 | Kapur et al. | 707/690 |
| 7,089,241 | B1 * | 8/2006 | Alspector et al. | 1/1 |
| 7,149,778 | B1 * | 12/2006 | Patel et al. | 709/206 |
| 7,171,450 | B2 * | 1/2007 | Wallace et al. | 709/206 |
| 7,219,148 | B2 * | 5/2007 | Rounthwaite et al. | 709/224 |
| 7,240,049 | B2 * | 7/2007 | Kapur | 1/1 |
| 7,472,163 | B1 * | 12/2008 | Ben-Yoseph et al. | 709/206 |
| 7,734,703 | B2 * | 6/2010 | Jhawar | 709/206 |
| 2003/0225841 | A1 * | 12/2003 | Song et al. | 709/206 |
| 2004/0003283 | A1 * | 1/2004 | Goodman et al. | 713/201 |
| 2004/0260776 | A1 * | 12/2004 | Starbuck et al. | 709/206 |
| 2005/0193076 | A1 * | 9/2005 | Flury et al. | 709/206 |
| 2006/0190481 | A1 * | 8/2006 | Alspector et al. | 707/103 R |
| 2006/0242247 | A1 * | 10/2006 | Richardson | 709/206 |
| 2007/0011324 | A1 * | 1/2007 | Mehr et al. | 709/225 |

* cited by examiner

*Primary Examiner*—Lashonda T Jacobs
(74) *Attorney, Agent, or Firm*—Fenwick & West LLP

(57) ABSTRACT

Methods, apparatuses, and computer-readable media for detecting bulk electronic messages using header similarity analysis. Bulk electronic messages can be detected by parsing (115) header fields of an electronic message; associating (120) at least one constituent unit with each header field defining a set of constituent units for each header field; ascertaining (230) a feature vector for each set of constituent units; forming (240) a collection of feature vectors; and computing (250) an inner product from a set of constituent units from an additional electronic message and the collection of feature vectors from the initial electronic message resulting in a measure of similarity between the initial electronic message and the additional electronic message.

18 Claims, 4 Drawing Sheets

BULK ELECTRONIC MESSAGE DETECTION BY HEADER SIMILARITY ANALYSIS

CROSS REFERENCE TO RELATED APPLICATIONS

This application is a divisional of U.S. patent application Ser. No. 10/942,395, filed Sep. 16, 2004, now U.S. Pat. No. 7,555,524, which is incorporated by reference herein in its entirety.

TECHNICAL FIELD

The present invention relates to methods, apparati, and computer-readable media for detecting bulk electronic messages and more particularly to a method for detecting bulk electronic messages by header similarity analysis.

BACKGROUND ART

Electronic networks provide a vast capability to communicate electronically. The list of electronic network communication methods such as email, SMS, voice-over-IP, and others continue to expand as this resource continues to mature. Along with the inherent advantages of electronic communication has been the bane of unwanted or unsolicited messages. Virtually every user of electronic mail is a target of unsolicited bulk email, often referred to as junk email, unsolicited bulk email ("UBE"), unsolicited commercial email ("UCE"), or spam (hereafter referred to collectively as unsolicited bulk electronic messages). As technology has evolved, methods have been developed to control these undesired messages. Senders of bulk messages, however, have responded by utilizing various techniques to obscure the source of the UBE they send in order to avoid the identification that would lead to limits on their activities. Conventionally, electronic messages include a header section that includes multiple required and optional lines of information, including the source and destination addresses of a message. Typical required lines include From, To, Message-ID, and X-Mailer. Optional lines include Reply-To, Organization, and Return-Path. Additional required header lines, denominated Received, are added to the message as the message passes through the mailer subsystems of Internet Service Providers ("ISPs") and other computer systems as necessary to reach a destination domain user. These Received lines are nominally beyond the control of individuals creating bulk messages.

Senders of bulk messages use anonymous mailers and redistributors to obscure the required email header lines of their UBE by specifying non-existent email systems and accounts. Modified mailers can be used to remove header lines completely or to substitute addresses of known valid electronic message accounts that are not actually associated with the sender of the bulk message.

These techniques are generally sufficient to prevent the UBE recipients from being able to identify and complain to the postmaster of the relevant ISP about the activities of an individual or company sending bulk messages. While the Received lines provide traceable information, the complexity of filtering through this information is usually beyond the level of effort that most UBE recipients will undertake. Even for those that do, the number of public complaints actually received by the ISP is significantly lower than the amount of bulk messages that transit the ISP, often allowing the sender of bulk messages to remain in operation for a significant length of time before being forced to find a new ISP to use for their activities.

Many techniques have been developed in the recent past to deal with the growing amount of UBE being received by network users. These techniques primarily include email client systems supporting manual email accept and reject lists, automated context analysis, use of public shared lists of known spam sources, and direct challenge systems. None is completely effective and all impose an additional degree of operating complexity on the email client user to varying degrees.

For instance, some email servers utilize a protocol whereby every email is examined for specific language that would indicate the email is undesirable (such as "sex" or "make money"). This can be a problem when the email must be opened (which may trigger a virus) and, in any event, requires processing power which has an attendant cost to the organization operating the server. There have also been attempts at heuristic protocols for examining the emails. Heuristic protocols attempt to examine the contents or other information contained in the message. These approaches also cause a delay in the delivery of email as the message is examined, particularly at a large organization which may receive a considerable amount of messages in a short period.

An alternative to examining the entire message is calculating a hash value of the contents or header fields. The hash value can be stored and compared to subsequent messages. When the values match, the existence of UBE is concluded and future messages with the same hash value are blocked. The advantage to such a technique is the relatively low processing time required to perform a hash function, but the technique does have limitations. Only exact copies can be identified. Any modification of the message, however slight, will result in the bulk message not being recognized.

Another technique to discover UBE is context analysis. Automated context analysis relies on key word usage and various patterns of advertisement pitches to discern UBE from other email. Suspected UBE is automatically discarded or, more typically, directed to an alternate email in-box of the client. Since the analysis is not, and as a practical matter cannot, be perfect, desired email may be wrongly characterized. Therefore, the user is generally required to review manually the messages in the alternate email in-box anyway. Thus, this technique functions only as an imperfect segregating filter against UBE, rather than a blocking filter.

There remains a clear need for an efficient method to identify unsolicited bulk electronic messages. It would be desirable to identify bulk electronic messages before their arrival at a client site despite minor alterations in either the message's header or content. The present invention addresses these and other problems, as well as provides additional benefits.

DISCLOSURE OF INVENTION

Methods, apparatuses, and computer-readable media for detecting bulk electronic messages using header similarity analysis. Bulk electronic messages can be detected by parsing (115) header fields of an electronic message; associating (120) at least one constituent unit with each header field defining a set of constituent units for each header field; ascertaining (230) a feature vector for each set of constituent units; forming (240) a collection of feature vectors; and computing (250) an inner product from a set of constituent units from an additional electronic message and the collection of feature vectors from the initial electronic message resulting in a measure of similarity between the initial electronic message and the additional electronic message.

BRIEF DESCRIPTION OF THE DRAWINGS

These and other more detailed and specific objects and features of the present invention are more fully disclosed in the following specification, reference being to the accompany drawings, in which.

DETAILED DESCRIPTION OF THE PREFERRED EMBODIMENTS

The present invention detects the presence of bulk electronic messages by examining the electronic messages' headers and, when necessary, contents, prior to their arrival at a client computer. By conducting a measurable examination and comparison of the constituent units of header fields and/or the content of a message, a determination can be made regarding the likelihood that the message is an unsolicited bulk electronic message.

The present invention offers the following advantages over the prior art:
  identification of unsolicited bulk electronic messages with minimal user input;
  obstruction of unsolicited electronic messages at a network juncture;
  enhanced network bandwidth by reducing or eliminating unsolicited bulk electronic messages;
  increased user satisfaction by minimizing unwanted and unsolicited electronic messages.

Unsolicited and undesired electronic messages are a growing problem that wastes network bandwidth, messaging system resources, and both human and computer processing time. As described herein, various techniques have attempted to reduce this problem. These techniques typically include anti-spam filtering software and/or hardware that analyze message streams. These analyses focus on detection of bulk electronic messages on an individual basis or on an association with a similar group of electronic messages. Considerable efficiency can be gained by identifying bulk electronic message mailings by simple association tests rather than extensive content examination of every electronic message. In such a scenario, only representative members of the bulk electronic message group need be examined. When a representative message is found to be a bulk electronic message, the larger group can be tagged as a bulk mailing using only simple group association metrics. The present invention provides innovative methods for performing bulk electronic message association tests to identify larger groups of messages that can be tagged as bulk or non-bulk electronic messages.

Bulk association tests examine a representative sample of the bulk electronic message group. Since the senders of bulk messages may personalize or try to conceal the similarity of their mailings, the present invention quickly identifies messages within a message group despite individual message differences. In one embodiment of the present invention, a detailed analysis of short header fields is accomplished, combined, when necessary, with a gross characterization of the full message content. In this manner, bulk electronic messages can be efficiently identified.

Figure 1:
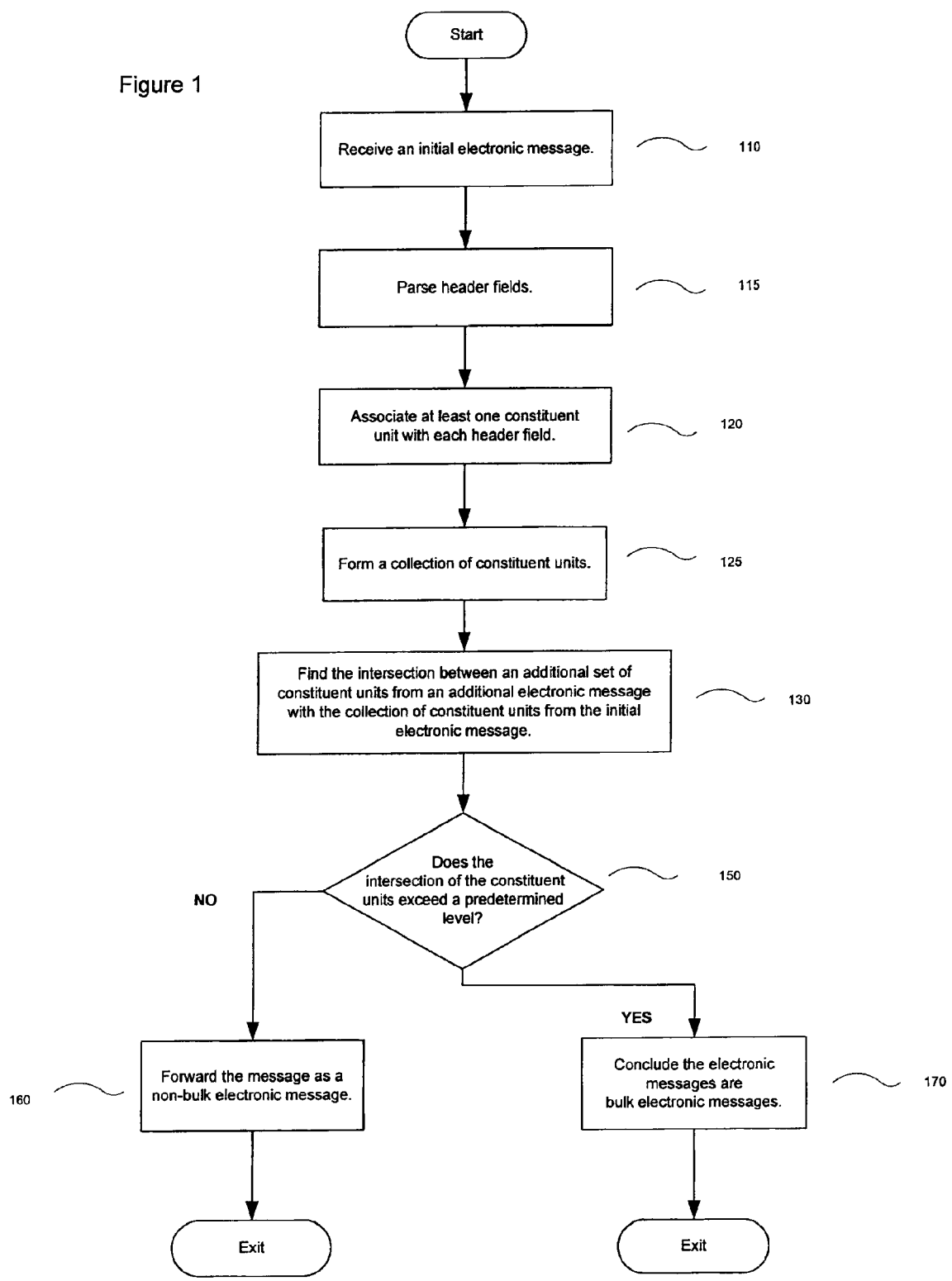
FIG. 1 is a flow diagram of one embodiment of a method to detect the transmission of bulk electronic messages using header similarity analysis.

FIG. 1 is flow diagram of one embodiment of a method to detect the transmission of bulk electronic messages using header similarity analysis. Upon receipt of a message 110 at an ISP, a network gateway, message server, router or similar network juncture, an examination module 320 is invoked to examine the message. In one embodiment, the message header fields are parsed 115. As the header fields are separated, each field is associated with at least one constituent unit 120. A collection of the constituent units is then formed 125 for analysis with and comparison to a subsequent electronic message. With the arrival of an additional electronic message, the constituent units from the additional message are compared with the collection of constituent units to determine whether an intersection exists 130. An analysis of the intersection then determines whether a predetermined level of similarity has been exceeded 150. When the similarly level has not been exceeded, the message is considered unique, and is not classified as a bulk electronic message. In such a situation the message is forwarded along its directed network path 160.

In the situation where the similarity between the constituent sets has exceeded the predetermined level, it is concluded that the message is a bulk electronic message 170. The predetermined similarity criteria can be set and adjusted based on a variety of factors known to one skilled in the art. In one embodiment, the intersection of constituent units 130 can seek the maximum similarity, and in another embodiment the minimum similarity can be sought. In yet another embodiment, a central tendency of similarity can be determined and used to determine whether a message is a bulk electronic message. Upon reaching this conclusion steps can be taken to block the transmission of so identified messages as well as provide useful information to individuals managing the network that bulk electronic messages have been detected.

Figure 2:
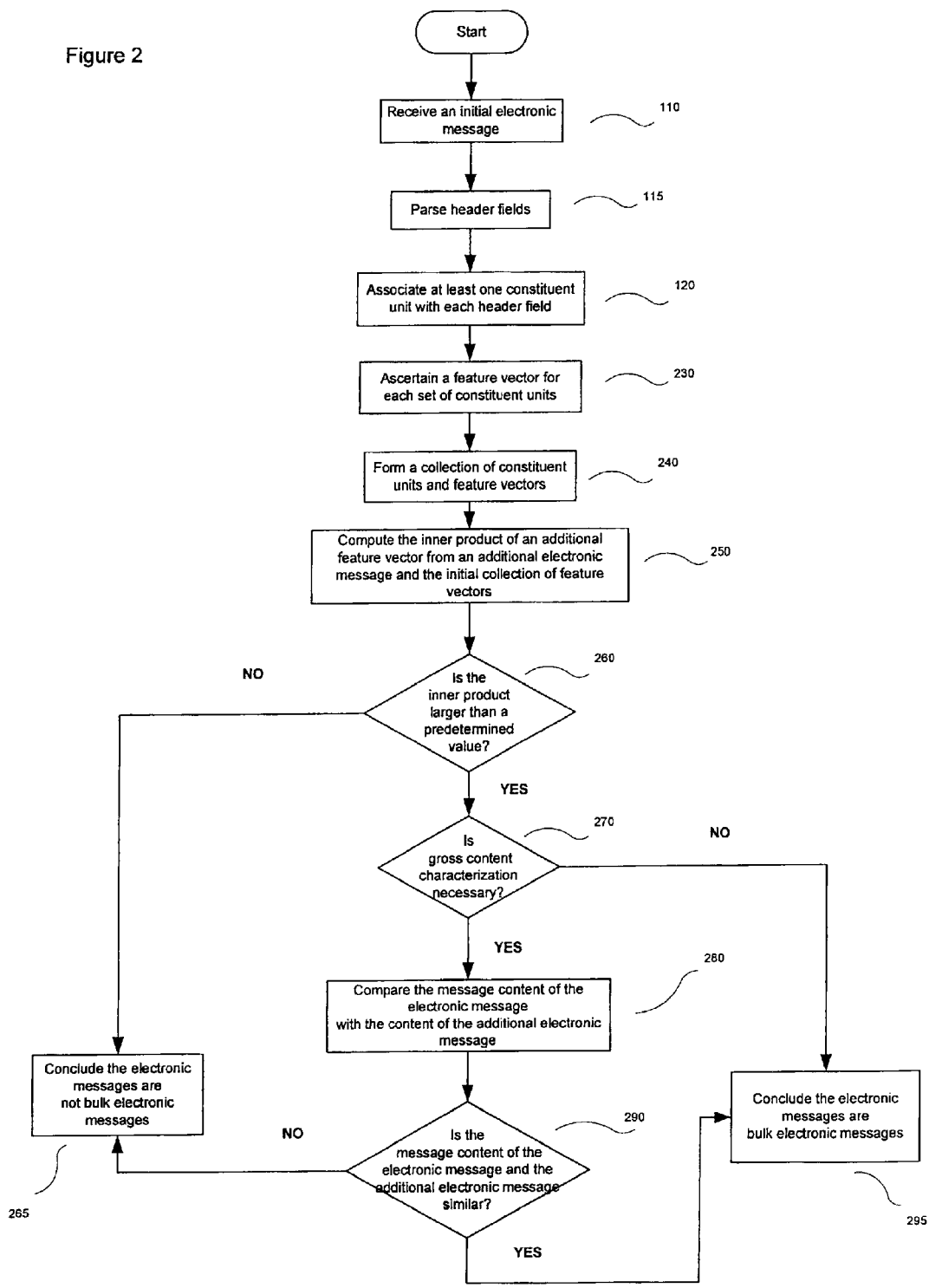
FIG. 2 is a flow diagram of one embodiment of a method to detect the transmission of bulk electronic messages using header similarity analysis and message content characterization.

An alternative embodiment of the present invention, shown in FIG. 2, uses header analysis and message content characterization. As discussed herein, upon receipt of a message at a network juncture 110, the message headers are parsed 115 and at least one constituent unit is associated with each header field 120. Using this information, a feature vector is ascertained for each set of constituent units 230, forming a collection of feature vectors and a collection of constituent units 240. The inner product of the set of feature vectors and a feature vector from an additional electronic message is computed 250 to provide a similarity value. The inner product is examined to determine whether it exceeds 260 a predetermined value. When the inner product does not reach the level of similarity that the examination is seeking, a conclusion is reached that the message in question is not a bulk electronic message 265. While this embodiment uses the inner product technique to compute a measure of similarity, it is contemplated that in other embodiments, other methods to measure and quantify header similarity in the presence of insertion/deletion polymorphism, familiar to one skilled in the art, would be equally compatible with the present invention. Linear, non-linear, ad-hoc measures, ordering of header features, and the like are all metrics that may be used measure the similarity of the headers. Once the predetermined similarity level is exceeded, the question of characterizing the content is addressed 270. When the similarity level of the header fields is significantly large, characterization and examination of the content is not warranted, and a conclusion can be reached 295 that the message is a bulk electronic message.

In situations where a definitive conclusion cannot be reached by exclusive header examination, a comparison of a gross characterization of message content is conducted 290. When the characterization of the content of the additional message is not similar to the characterization of the contents of previous messages, the additional message is deemed not a bulk transmission 265. When the characterization of the content of the additional message is similar to the characterization of the contents of previous messages, the existence of a bulk electronic message is declared 295. As one skilled in the relevant art will appreciate, several techniques can be used to characterize the content of an electronic message. It is contemplated that any of these methods, singularly or in combination, or any techniques having similar function and purpose that are adaptable and consistent with this description, can be implemented by the present invention. In one embodiment of the present invention, the content of the messages in question is characterized by message payload length. In another embodiment of the present invention, the content is characterized by message type, such as text image, HTML, MIME type, etc.

Broadly, the present invention provides a bulk electronic message association method based upon an insertion/deletion polymorphism test on message header fields, and, when necessary, a gross message content characterization. The significance of this type of testing can be appreciated when considering the tactics employed by senders of bulk electronic messages to circumvent detection schemes.

To conceal the similarity of a bulk transmission of electronic messages, senders may use techniques such as the addition of a random word or character string to the subject field of the message. They also incorporate the recipient's name or login to the subject field of the message, randomize synonyms or similar phrases to compose the subject field of the message, include random invisible content in the body of the message, or use random different equivalent URLs or link fields within the body of the message. These techniques will thwart many of the current bulk mailing detection methodology.

For example, a header field broken into ten "words" or sub-sequences, where there are two synonyms for each word, has over a thousand unique combinations. When there are four synonyms for each word, over a million unique combinations exist that convey the same message. Consider the following header information.

A message header provides a historical trail of a messages origin. Consider below, a message header sent by "Company" to "User" for the purposes of advertising a bulk email product.

---

Microsoft Mail Internet Headers Version 2.0
   Received: from chi2kexcn01 . . . com ([10.10.157.200]) by
  sfo2kex01 with Microsoft SMTPSVC(5.0.2195.5329);
    Tue, 13 Jul 2004 06:58:25 -0700
   Received: from CHI2KEX01.company.com ([10.10.171.101]) by
  chi2kexcn01.company.com with Microsoft SMTPSVC
  (5.0.2195.5329);
    .
    .
    .
   To: "User, M C." <muser@company.com>
   Cc: john_doe@company2.com,
    "John Doe" <cdoe@company2.com>,
    "User1, L G." <luser1@company.com>
   Subject: Five Ways to Remove Bulk email for M.C. User
  44420423-9037
   MIME-Version: 1.0
   X-Mailer: Lotus Notes Release 6.5 September 18, 2003
   Message-ID: <OFBAA83247.0EA17C6A-

-continued

ON88256ED0.004C8AA0-
88256ED0.004CCAB2@company2.com>
   From: Jane Doe <jane_doe@company2.com>
   Date: Tue, 13 Jul 2004 06:58:19 -0700
    .
    .
    .
   Content-Transfer-Encoding: base64
   Content-Type: image/jpeg
   Content-ID: <_2_0C4450180C444C64004CCAA188256ED0>
   --=_related 004CCAA288256ED0_=
   Content-Transfer-Encoding: base64
   Content-Type: image/jpeg
   Content-ID: <_2_0C42DE340C42DA80004CCAA188256ED0>
   --=_related 004CCAA288256ED0_=--

---

Without altering the meaning of the message, the subject line alone can be manipulated with synonyms and alterations. For the words "ways", "remove" and "bulk" there are 6, 7, and 8 synonyms easily obtained though commercial word processors. Furthermore, the word "five" can be replaced by the numeral 5. Finally, the addition of the addressee to the subject line ensures that the subject line or any two messages are always unique.

To combat these and other techniques, one embodiment of the present invention uses insertion/deletion polymorphism testing based upon an insertion/deletion similarity metric to detect message header similarities that would fail an exact match test. As a clarification of the similarity metric, assume first one is comparing two corresponding header fields of two messages for similarity, and that each has been broken down into its constituent units, which may be words, punctuation symbols, numbers, etc. Let $F_1$ and $F_2$ be the respective sets of constituent units for the corresponding fields of the two messages being compared. Define their insertion/deletion similarity to be simply the cardinality of their feature sets intersection:

$$F_1 \sim F_2 = |F_1 \cap F_2| \qquad [\text{Eq. 1}]$$

For example, if $F_1=\{a,b,c,d,e\}$, and $F_2=\{b,c,d,e,f\}$ then $F_1 \sim F_2 = 4$.

Now consider the case of a collection of fields $F_1, F_2, \ldots, F_k$ and the desire to know the similarity of $F_{k+1}$ to the members of the collection. There are a variety of ways to define this group similarity. In one embodiment, it could be defined liberally as the maximum similarity of $F_{k+1}$ to any member of the group, i.e.

$$F_{k+1} \sim [F_1, F_2, \ldots, F_k] = \max_{1 \leq i \leq k} (F_i \sim F_{k+1}) \qquad [\text{Eq. 2}]$$

$F_{k+1} \sim [F_1, F_2, \ldots, F_k] = \max(F_i \sim F_{k+1})$ [Eq. 2]

In another embodiment, and perhaps more conservatively, it could be defined as the minimum similarity. Alternatively, an intermediate way would be to take some average of the similarities of $F_{k-1}$ to the members of the group, i.e.

$$F_{k-1} \sim [F_1, F_2, \ldots, F_k] = \underset{1 \leq i \leq k}{\mathrm{avg}} (F_i \sim F_{k+1}) \qquad [\text{Eq. 3}]$$

$F_{k-1} \sim [F_1, F_2, \ldots, F_k] = \mathrm{avg}(F_i \sim F_{k+1})$ [Eq. 3]

where the "average" could be any measure of central tendency, such as the arithmetic mean, the median, the mode, or geometric or harmonic means.

In yet another embodiment, an average feature vector for the collection can be computed. The inner product of the feature vectors can then be used as the similarity metric. Assuming n possible words or terms of interest, then a feature vector is just a binary n-tuple with a 1 in every position corresponding to a term present in the field, and a 0 in every position corresponding to a term not present in the field. The similarity of two fields is then just their inner product:

$$F_1 \sim F_2 = F_1 \cdot F_2 \quad [\text{Eq. 4}]$$

So continuing with the original example, when the pool of terms of interest are the set $\{a, h, c, d, e, f\}$ and $F_1 = \{a,b,c,d,e\}$ with feature vector $<1,1,1,1,1,0>$ and $F_2 = \{b,c,d,e,f\}$ with feature vector $<0,1,1,1,1,1>$, then $F_1 \sim F_2 = F_1 \cdot F_2 = 4$, as before. A collection of fields $[F_1, F_2, \ldots, F_k]$ can be characterized by a feature vector $<f_1, f_2, \ldots, f_n>$ where the $f_i$ are the relative occurrence frequencies of the respective terms within the collection. Letting this collection's characteristic feature vector be $\hat{F}$, then $$F_{k+1} \sim [F_1, F_2, \ldots, F_{k+1}] \sim \hat{F} = F_{k+1} \cdot \hat{F} \quad [\text{Eq. 5}]$$

When $F_1$ and $F_2$ are as above, then $\hat{F}$ for $[F_1, F_2]$ would be $<0.5,1,1,1,1,0.5>$ since the terms 'a' and 'f' only appear in half the collection, whereas the other terms appear in all members of the collection. Therefore, when $F_3 = \{a,b,e,f\}$ with feature vector $<1,1,0,0,1,1>$, its similarity with $\hat{F}$ would be 3.

Figure 3:
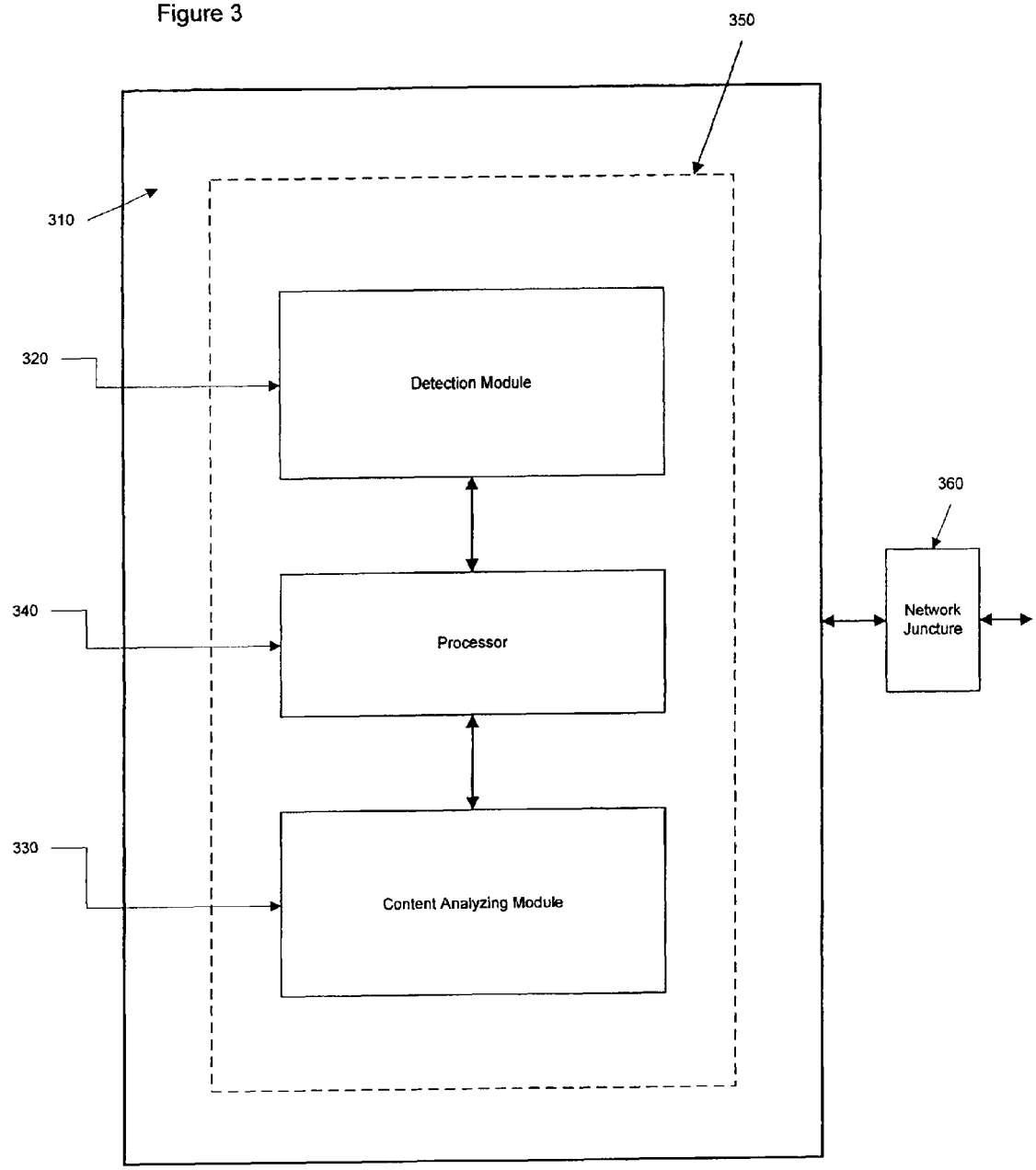
FIG. 3 is a block diagram of one embodiment of detection apparatus for detecting bulk electronic messages using header similarity analysis.

FIG. 3 is a block diagram of one embodiment of detection apparatus 310 for detecting bulk electronic messages using header similarity analysis. A header similarity detection module 320 is communicatively coupled to a processor 340 capable of executing instructions embodied in a computer-readable medium. The processor 340 is further communicatively coupled to a content analyzing module 330. In one embodiment, the header similarity module 320, the content analyzing module 330 and the processor 340 are collectively known as the examination module 350. The detection apparatus 310 is communicatively coupled to a network juncture 360 such as an enterprise gateway, router, satellite link, or server.

Figure 4:
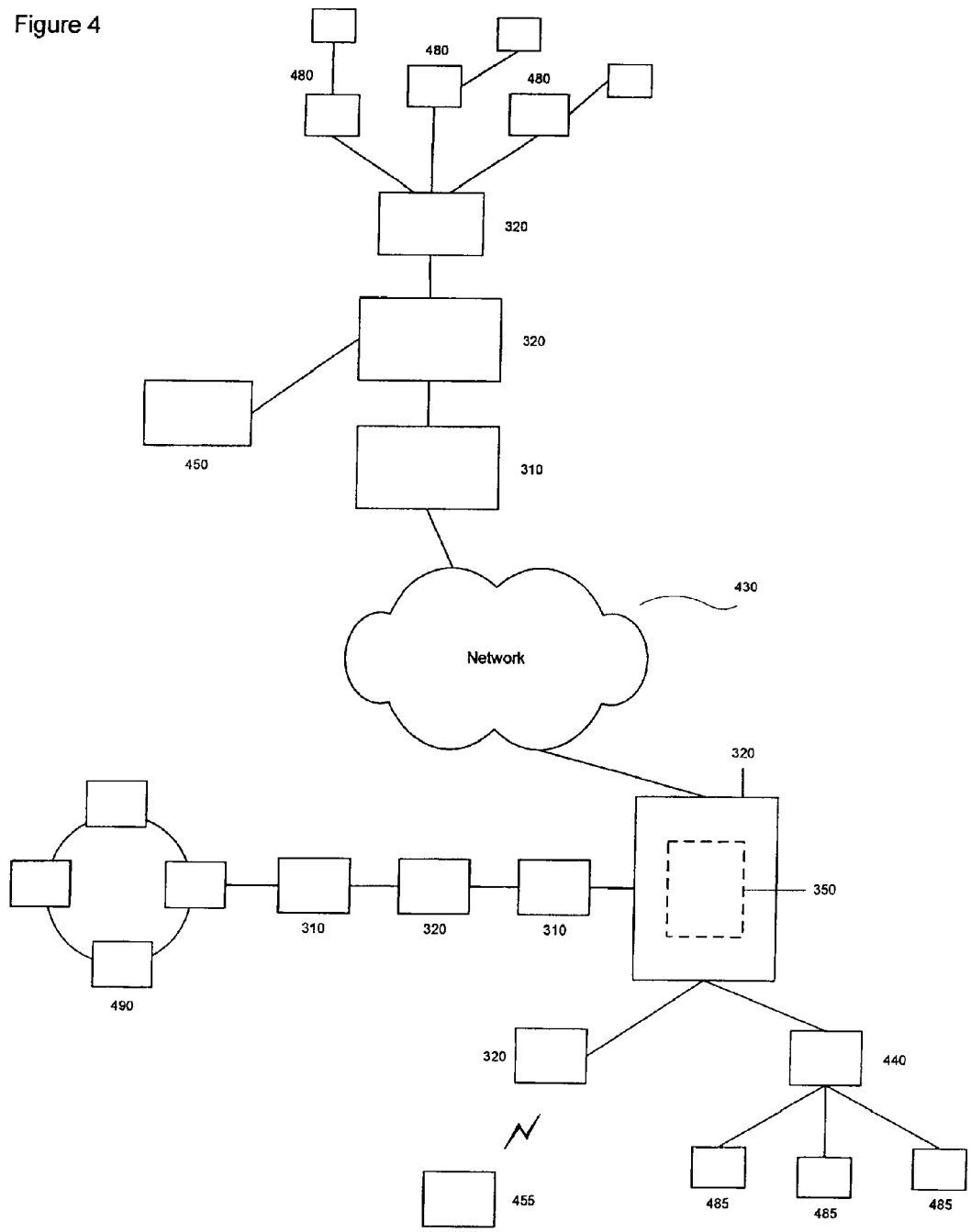
FIG. 4 is one embodiment of a network using a detection apparatus for detecting bulk electronic messages using header similarity analysis.

FIG. 4 is a network diagram showing one embodiment of an implementation of a bulk electronic message detection apparatus 310. A network juncture 320, such as a router, is communicatively coupled to a network hub or server 440. The server 440 can be in communication with regional networks 480, client computers 450, Ethernet networks 485, token ring networks 490, or the like. The detection apparatus 310, having an examination module 350, is interposed in the network such that it can intercept messages for examination prior to their distribution. While it is contemplated that the present invention can be employed in a distributed manner, one embodiment of the present invention is for the invention to retain its versatility as a detachable, stand alone unit. As shown in FIG. 4, the present invention can be implemented at any network juncture 320, such as originating ISPs 320, to foil attempts to send unsolicited and unwanted bulk electronic messages on the sender side. It may also be implemented by destination ISPs 320, network gateways, or email servers 320 to filter bulk messages on the receiver side. It is further contemplated that the present invention may be implemented by backbone routers within the Internet to detect and possibly remove bulk electronic messages in transit over the backbone. As discussed herein, the examination module 350 can be incorporated into a network juncture 310 to examine both incoming and outgoing messages.

While it is contemplated that the present invention will be used on network computers, it is possible to apply the methodology presented here to network environments with multiple servers in several locations. Although not required, method embodiments of the invention can be implemented via computer-executable instructions, such as routines executed by a general purpose computer, e.g., a server or client computer. The computer-executable instructions can be embodied in hardware, firmware, or software residing on at least one computer-readable media, such as hard discs, floppy discs, optical drives, Compact Discs, Digital Video Discs, etc. Those skilled in the relevant art will appreciate that the invention can be practiced with other computer system configurations, including Internet appliances, hand-held devices, wearable computers, cellular or mobile phones, multi-processor systems, microprocessor-based or programmable consumer electronics, set-top boxes, network PCs, mini-computers, mainframe computers and the like. The invention can be embodied in a special purpose computer or data processor that is specifically programmed, configured, or constructed to perform at least one of the computer-executable instructions as explained herein. The invention can also be practiced in distributed computing environments where tasks or modules are performed by remote processing devices, which are linked through a communications network. In a distributed computing environment, program modules may be located in both local and remote memory storage devices.

The above description is included to illustrate the operation of various embodiments of the invention and is not meant to limit the scope of the invention. The elements and steps of the various embodiments described above can be combined to provide further embodiments. The scope of the invention is to be limited only by the following claims. Accordingly, from the above discussion, many variations will be apparent to one skilled in the art that would yet be encompassed by the spirit and scope of the present invention.

What is claimed is:

1. A computer-implemented method for detecting bulk electronic messages, comprising:
    parsing, by a computer system, header fields of at least one electronic message;
    associating, by the computer system, at least one constituent unit with each header field to define a set of constituent units for each field;
    forming, by the computer system, a collection of constituent unit sets;
    finding, by the computer system, cardinality of an intersection between an additional set of constituent units from an additional electronic message and the collection of constituent unit sets, to determine a measure of similarity; and
    responsive to the measure of similarity exceeding a predetermined level, concluding, by the computer system, that the electronic messages are bulk electronic messages.

2. The method of claim 1, wherein the measure of similarity is a maximum similarity of the additional set of constituent units to any member of the collection of constituent unit sets.

3. The method of claim 1, wherein the measure of similarity is a minimum similarity of the additional set of constituent units to any member of the collection of constituent unit sets.

4. The method of claim 1, wherein the measure of similarity is a central tendency of similarities of the additional set of constituent units to members of the collection of constituent unit sets.

5. The method of claim 4, wherein the central tendency is an arithmetic mean.

6. The method of claim 4, wherein the central tendency is a median.

7. At least one computer-readable storage medium containing computer program instructions for detecting bulk electronic messages, the computer program instructions performing steps comprising:
- determining a measure of similarity between headers of at least two electronic messages;
- calculating a measure of similarity between message content of the at least two electronic messages; and
- classifying the at least two messages as bulk electronic messages when the measure of similarity between the headers and the measure of similarity between the message content exceed a predetermined level.

8. The at least one computer-readable storage medium of claim 7 wherein the computer program instructions further perform the steps of:
- parsing header fields of the least two electronic messages;
- associating at least one constituent unit with each header field, defining a set of constituent units for each field;
- forming a collection of constituent unit sets for each electronic message; and
- finding cardinality of an intersection between each set of constituent units to determine the measure of similarity between headers.

9. The at least one computer-readable storage medium of claim 8, wherein the measure of similarity is determined based on a maximum similarity between the sets of constituent units.

10. The at least one computer-readable storage medium of claim 8, wherein the measure of similarity is determined based on a minimum similarity between the sets of constituent units.

11. The at least one computer-readable storage medium of claim 8, wherein the measure of similarity is determined based on a central tendency of similarities between the sets of constituent units.

12. The at least one computer-readable storage medium of claim 11, wherein the central tendency is an arithmetic mean.

13. An apparatus having a computer-readable storage medium having computer program instructions embodied therein for detecting bulk electronic messages, the computer program instructions comprising:
- an examination module adapted to:
  - determine a measure of similarity between headers of at least two electronic messages;
  - calculate a measure of similarity between message content of the at least two electronic messages; and
  - classify the at least two messages as bulk electronic messages when the measure of similarity between the headers and the measure of similarity between the message content exceed a predetermined level; and
- coupled communicatively to the examination module, a blocking module adapted to block the transmission of the at least two electronic messages responsive to the at least two electronic messages being classified as bulk electronic messages.

14. The apparatus of claim 13 wherein the examination module, in determining the measure of similarity between headers of the at least two electronic messages, is further adapted to:
- parse header fields of the least two electronic messages;
- associate at least one constituent unit with each header field, defining a set of constituent units for each field;
- form a collection of constituent unit sets for each electronic message; and
- find cardinality of an intersection between each set of constituent units to determine the measure of similarity between headers.

15. The apparatus of claim 14, wherein the measure of similarity is determined based on a maximum similarity between the sets of constituent units.

16. The apparatus of claim 14, wherein the measure of similarity is determined based on a minimum similarity between the sets of constituent units.

17. The apparatus of claim 14, wherein the measure of similarity is determined based on a central tendency of similarities between the sets of constituent units.

18. The apparatus of claim 17, wherein the central tendency is an arithmetic mean.

* * * * *